US012630228B2

(12) United States Patent
Wu et al.

(10) Patent No.: US 12,630,228 B2
(45) Date of Patent: May 19, 2026

(54) TRAILER CARRIAGE

(71) Applicant: GUANGDONG FUWA HEAVY INDUSTRIES CO., LTD., Jiangmen (CN)

(72) Inventors: Zhiqiang Wu, Jiangmen (CN); Yu Wang, Jiangmen (CN); Heng Zhang, Jiangmen (CN)

(73) Assignee: GUANGDONG FUWA HEAVY INDUSTRIES CO., LTD., Jiangmen (CN)

( * ) Notice: Subject to any disclaimer, the term of this patent is extended or adjusted under 35 U.S.C. 154(b) by 364 days.

(21) Appl. No.: 18/283,495

(22) PCT Filed: Aug. 4, 2022

(86) PCT No.: PCT/CN2022/110377

§ 371 (c)(1),
(2) Date: Sep. 22, 2023

(87) PCT Pub. No.: WO2023/236338

PCT Pub. Date: Dec. 14, 2023

(65) Prior Publication Data

US 2025/0033702 A1 Jan. 30, 2025

(30) Foreign Application Priority Data

Jun. 5, 2022 (CN) .......................... 202210626757.6

(51) Int. Cl.
B62D 21/20 (2006.01)
B62D 21/03 (2006.01)
(52) U.S. Cl.
CPC ............. B62D 21/20 (2013.01); B62D 21/03 (2013.01)

(58) Field of Classification Search
CPC ........ B62D 61/10; B62D 61/00; B62D 63/00; B62D 63/06; B62D 63/068; B62D 63/08;
(Continued)

(56) References Cited

U.S. PATENT DOCUMENTS 8,801,013 B2 * 8/2014 Ramsey ................. B62D 21/11
280/124.11
9,827,820 B2 * 11/2017 McComsey .............. B60G 1/00
(Continued)

FOREIGN PATENT DOCUMENTS

CN 200957839 Y 10/2007
CN 205220804 U 5/2016
(Continued)

*Primary Examiner* — Gregory A Blankenship
(74) *Attorney, Agent, or Firm* — The Webb Law Firm

(57) ABSTRACT

A trailer carriage includes two longitudinal beams and at least two cross beams between the two longitudinal beams. The longitudinal beam includes a side wall, an upper connecting wall and a lower connecting wall. The cross beam includes an upper connecting plate, a lower connecting plate below the upper connecting plate, and an end plate between the upper connecting plate and the lower connecting plate. The upper connecting plate abuts against a bottom of the upper connecting wall, the lower connecting plate abuts against a top of the lower connecting wall, the end plate abuts against an inner side of the side wall. The upper connecting plate is connected with the upper connecting wall via a first huck bolt, the lower connecting plate is connected with the lower connecting wall via a second huck bolt, the end plate is connected with the side wall via a third huck bolt.

7 Claims, 5 Drawing Sheets

(58) Field of Classification Search
CPC ........ B62D 21/10; B62D 21/14; B62D 21/11;
B62D 53/06
See application file for complete search history.

(56) References Cited

U.S. PATENT DOCUMENTS

| | | | | |
|---|---|---|---|---|
| 10,011,153 | B1 * | 7/2018 | Klein | B62D 53/068 |
| 10,370,033 | B1 * | 8/2019 | Klein | B62D 21/20 |
| 12,296,640 | B2 * | 5/2025 | Daniels | B60G 7/001 |
| 2005/0082814 | A1 | 4/2005 | Ramsey | |
| 2005/0218646 | A1 * | 10/2005 | Ramsey | B62D 21/02 |
| | | | | 280/788 |
| 2007/0045981 | A1 | 3/2007 | Galazin et al. | |
| 2008/0035814 | A1 * | 2/2008 | Xie | B62D 27/065 |
| | | | | 248/228.1 |
| 2017/0370451 | A1 * | 12/2017 | Wall | B62D 21/20 |
| 2018/0334004 | A1 | 11/2018 | Andreasen et al. | |
| 2018/0370311 | A1 * | 12/2018 | Lin | B62D 21/02 |
| 2019/0375456 | A1 | 12/2019 | Cassway et al. | |
| 2024/0149949 | A1 * | 5/2024 | Wu | B62D 21/11 |
| 2025/0033702 | A1 * | 1/2025 | Wu | B62D 21/20 |
| 2025/0074511 | A1 * | 3/2025 | Wu | B62D 21/20 |

FOREIGN PATENT DOCUMENTS

| | | | |
|---|---|---|---|
| CN | 208881907 | U | 5/2019 |
| CN | 110696924 | A | 1/2020 |
| CN | 217575356 | U | 10/2022 |
| EP | 0950551 | A1 | 10/1999 |
| EP | 0963901 | A2 | 12/1999 |
| JP | H06305445 | A | 11/1994 |

* cited by examiner

TRAILER CARRIAGE

CROSS-REFERENCE TO RELATED APPLICATIONS

This application is the United States national phase of International Application No. PCT/CN2022/110377 filed Aug. 4, 2022, and claims priority to Chinese Patent Application No. 202210626757.6 filed Jun. 5, 2022, the disclosures of which are hereby incorporated by reference in their entireties.

BACKGROUND

1. Technical Field

The present disclosure relates to the technical field of commercial vehicles, and in particular to a trailer carriage.

2. Technical Considerations

A carriage is mounted on a girder of a trailer frame, and a suspension system of the trailer is mounted on the carriage. The carriage and the girder of the trailer can be movably cooperated, in other words, the position of the carriage in a length direction of the girder of the trailer can be adjusted, and then a distance between the trailer and a tractor can be adjusted, so that load can be distributed reasonably. In this way, the trailer can adapt to different road conditions. The existing carriage is usually composed of two longitudinal beams, a plurality of cross beams, and a bracket for mounting the suspension system. The joints between the longitudinal beams and the cross beams are fixed by welding, and the bracket is fixed on the longitudinal beams by welding. Therefore, the longitudinal beams and the cross beams need to be welded in advance, and then the carriage is sent to an assembly plant for assembly with the trailer through logistics. After the longitudinal beams and the cross beams are welded, due to their large size and weight, they occupy a relatively large space and are difficult to carry, resulting in a high transportation cost for the carriage.

SUMMARY

In view of the defects in the existing technology, the present disclosure aims at providing a trailer carriage in which the longitudinal beam and the cross beam can be transported separately, thereby reducing the transportation cost of the carriage and realizing the quick assembly of the carriage.

In order to achieve the above object, the present disclosure adopts the following technical theme.

Provided is a trailer carriage including two longitudinal beams located at both sides of the carriage and at least two cross beams located between the two longitudinal beams, wherein:

each of the longitudinal beams includes a side wall, an upper connecting wall located at a top of the side wall and a lower connecting wall located at a bottom of the side wall and opposite to the upper connecting wall;

each of the cross beams includes an upper connecting plate, a lower connecting plate located below the upper connecting plate and opposite to the upper connecting plate, and an end plate located between end portions of the upper connecting plate and the lower connecting plate; an end portion of the cross beam is placed between the upper connecting wall and the lower connecting wall of the longitudinal beam, the upper connecting plate abuts against a bottom of the upper connecting wall, the lower connecting plate abuts against a top of the lower connecting wall, and the end plate abuts against an inner side of the side wall; and the upper connecting plate is connected with the upper connecting wall via a first huck bolt, the lower connecting plate is connected with the lower connecting wall via a second huck bolt, and the end plate is connected with the side wall via a third huck bolt.

The top of the side wall is provided with a bent part extending inward and a connecting part extending downward from an inner side of the bent part, the upper connecting wall is formed by bending a bottom of the connecting part inward, and a reinforcing piece is arranged above the upper connecting wall, the reinforcing piece includes a reinforcing bottom plate abutting against an upper surface of the upper connecting wall and a reinforcing rib plate bent upward from one end of the reinforcing bottom plate, the reinforcing rib plate is perpendicular to a length direction of the longitudinal beam, an outer edge of the reinforcing rib plate abuts against the connecting part and is welded fixedly to the connecting part; a threaded rod of the first huck bolt sequentially passes through the upper connecting plate, the upper connecting wall and the reinforcing bottom plate from bottom to top, and a nut of the first huck bolt is pressed on an upper surface of the reinforcing bottom plate.

The trailer carriage further includes brackets, the brackets include an outer bracket located outside the longitudinal beam and an inner bracket located inside the outer bracket, a mounting space is formed between the outer bracket and the inner bracket, a top of the outer bracket abuts against an outer surface of the side wall, a threaded rod of the third huck bolt sequentially passes through the end plate, the side wall and the top of the outer bracket from inside to outside, and a nut of the third huck bolt is pressed on an outer surface of the outer bracket.

A lower supporting plate is welded fixedly on an inner side of the outer bracket, a convex rib protruding upward and extending along a length direction of the longitudinal beam is arranged on the lower connecting wall, the lower connecting plate is placed above a top of the convex rib, the lower supporting plate is covered at an opening below the convex rib, a threaded rod of the second huck bolt passes through the upper connecting plate, the convex rib and the lower supporting plate from top to bottom, and a nut of the second huck bolt is pressed on a lower surface of the lower supporting plate.

The outer bracket is provided with a positioning groove, and a positioning part is formed at a joint position of the side wall and the lower connecting wall on the longitudinal beam, and the positioning part cooperates with the positioning groove to form a positioning assembly.

The inner bracket includes two side plates and a horizontal connecting plate positioned between the two side plates, and the horizontal connecting plate abuts against a lower surface of the lower connecting plate of the cross beam, and the horizontal connecting plate is connected to the lower connecting plate via a fourth huck bolt.

The cross beam includes two connecting beams with C-shaped cross sections, openings of the two connecting beams are oppositely arranged, and each connecting beam includes an upper connecting plate, a lower connecting plate and a web plate for connecting the upper connecting plate and the lower connecting plate together; the two side plates of the inner bracket are respectively attached to outer sides of the two web plates of the cross beam, and the web plates and the side plates are connected by a fifth huck bolt.

A supporting piece located between the upper connecting plate and the lower connecting plate is arranged in the connecting beam, the supporting piece is Z-shaped, and a top of the supporting piece is arranged around a threaded rod of the first huck bolt, and a bottom of the supporting piece is arranged around a threaded rod of the fourth huck bolt.

The present disclosure has the beneficial effects as follows.

According to the present disclosure, the longitudinal beam has a structure with a C-shaped cross section, so that the end of the cross beam can be inserted into the longitudinal beam. The end plate, the upper connecting plate and the lower connecting plate on the cross beam respectively abuts against the side wall, the upper connecting plate and the lower connecting wall of the longitudinal beam. The end plate and the side wall, the upper connecting plate and the upper connecting wall, the lower connecting plate and the lower connecting wall are respectively fixedly connected by huck bolts in such a way that the third huck bolt connects the longitudinal beam with the cross beam along the width direction of the carriage, the first huck bolt and the second huck bolt connects the longitudinal beam with the cross beam along the height direction of the carriage. Because the longitudinal beam and the cross beam are fixed in a welding-free way, the longitudinal beam and the cross beam can be transported separately, so that the transportation cost is reduced. Meanwhile, the longitudinal beam and the cross beam can be fixed together by the huck bolts to realize the quick assembly of the carriage.

DETAILED DESCRIPTION

Figure 1:
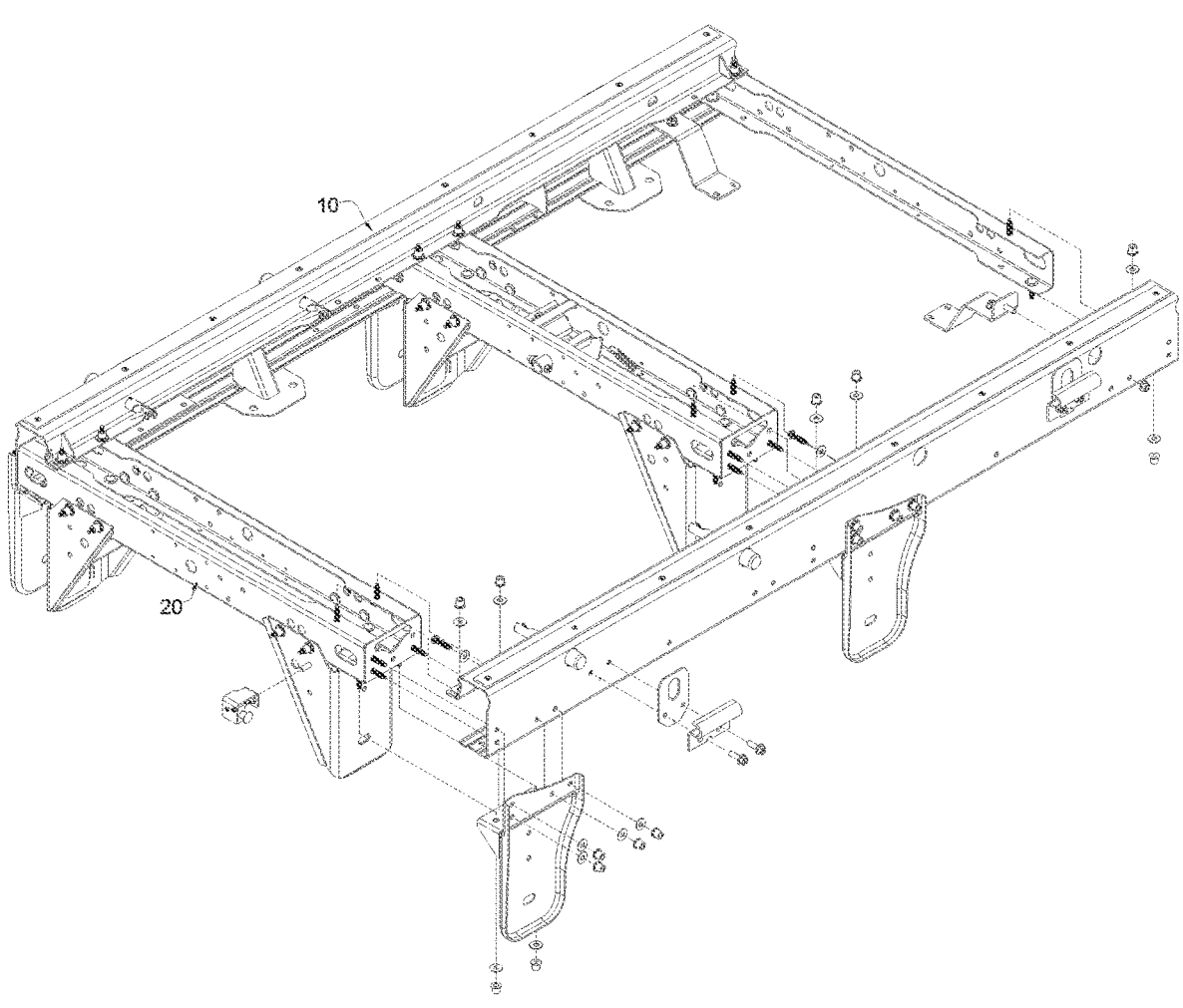
FIG. 1 is a structural schematic diagram of the present disclosure.
Figure 2:
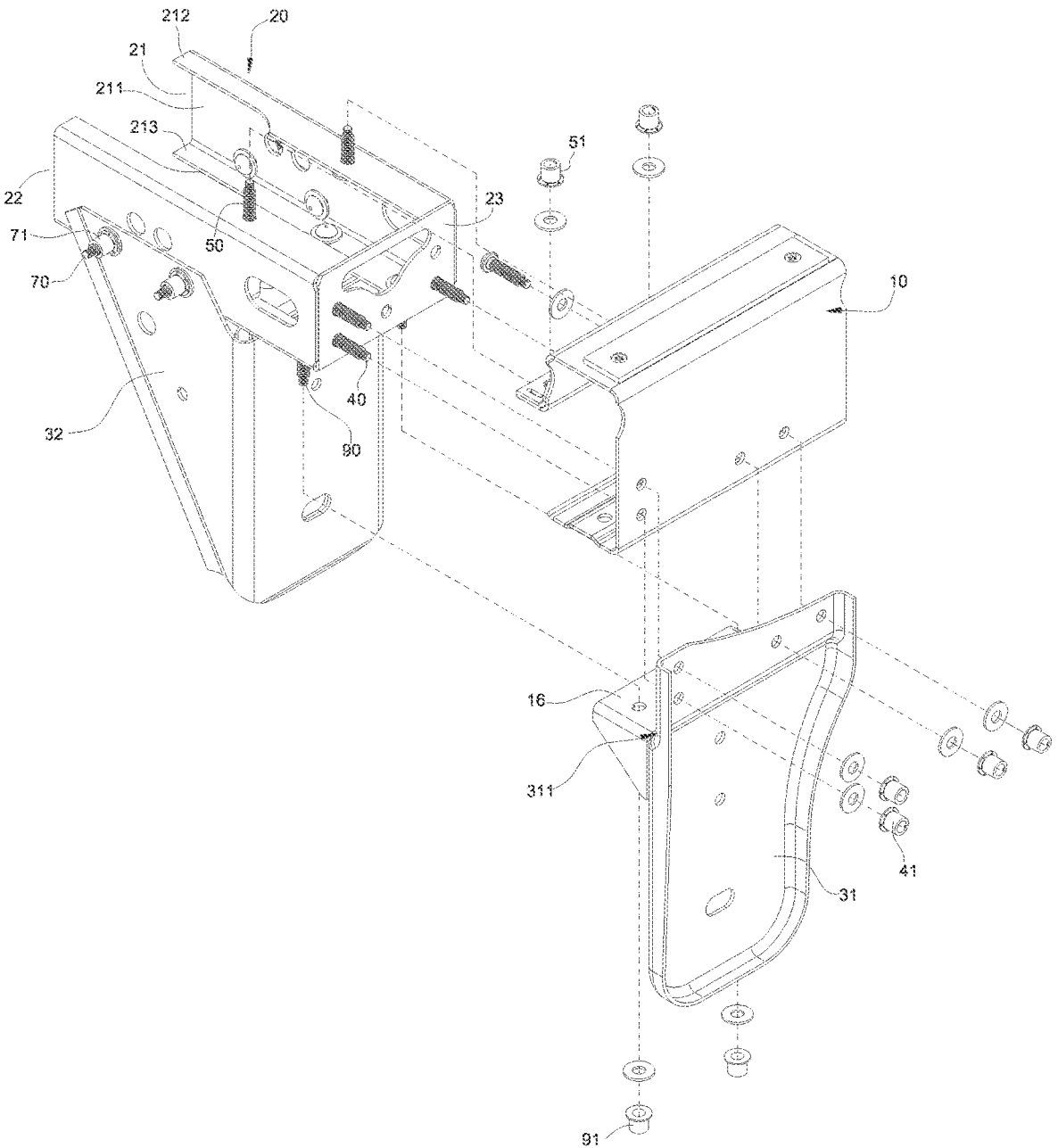
FIG. 2 is a schematic diagram of mounting of the present disclosure.
Figure 3:
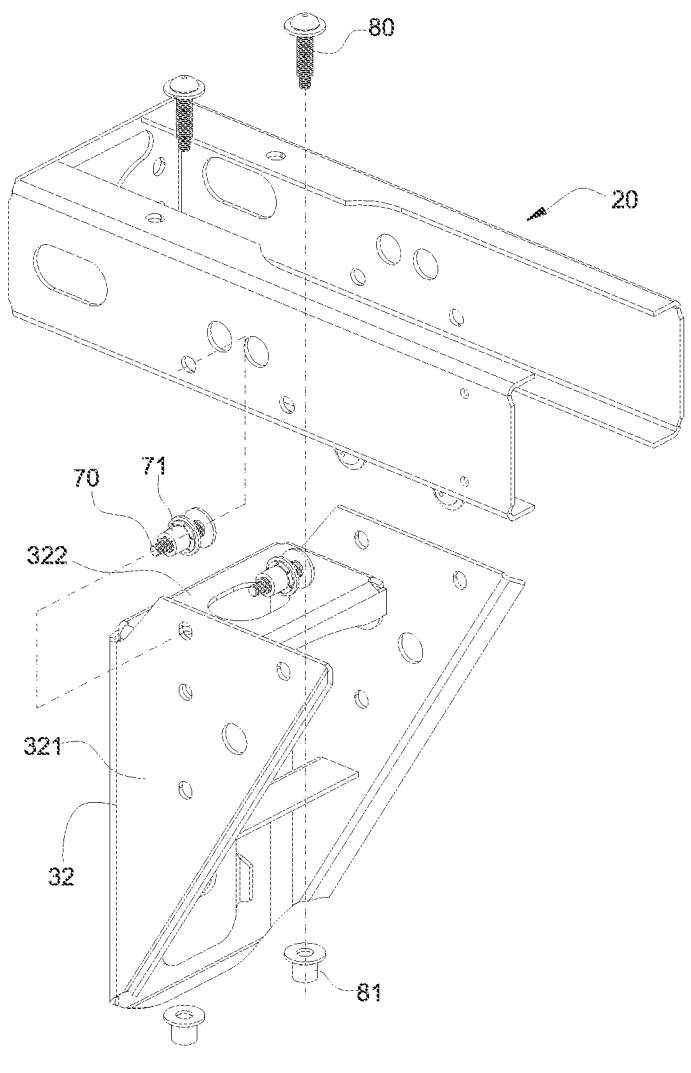
FIG. 3 is a schematic diagram of mounting of an inner bracket and a cross beam in FIG. 2.
Figure 4:
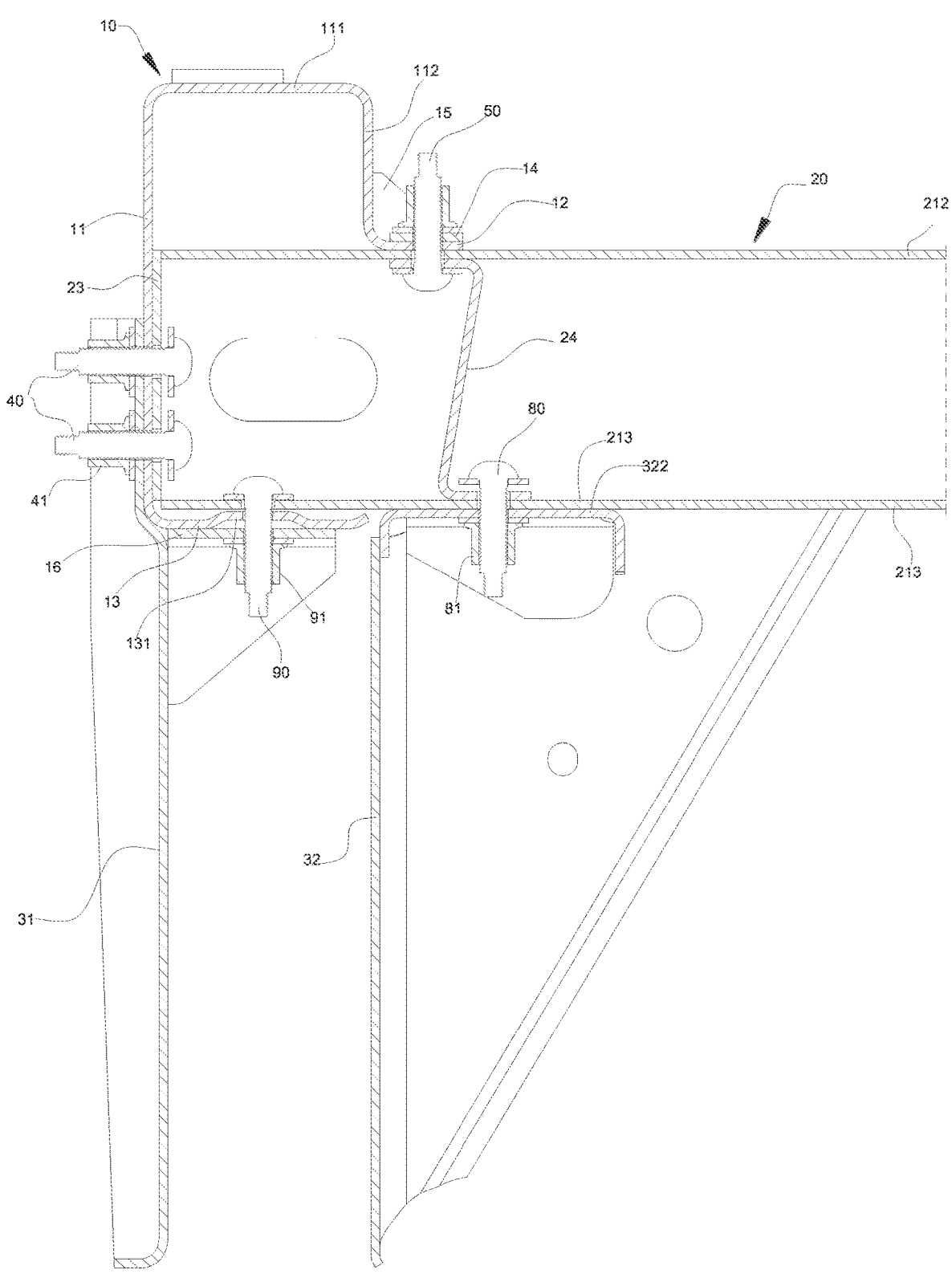
FIG. 4 is a sectional view of the present disclosure.

The present disclosure will be further described in conjunction with the accompanying drawings and the detailed description hereinafter:

As shown in FIG. 1 to FIG. 4, a trailer carriage includes two longitudinal beams 10 and two cross beams 20, wherein the two longitudinal beams 10 are respectively located at two sides of the carriage and extend along a length direction of the carriage; the two cross beams 20 extend along a width direction of the carriage and are located between the two longitudinal beams 10; and both ends of each of the cross beams 20 are respectively fixed with the two longitudinal beams 10, so that the carriage forms a frame structure which can be placed on the trailer frame. The longitudinal beam 10 is formed by bending a plate. Viewed from a cross section of the longitudinal beam 10, the longitudinal beam 10 includes a side wall 11, an upper connecting wall 12 located at a top of the side wall 11, and a lower connecting wall 13 located at a bottom of the side wall 11. The lower connecting wall 13 is arranged opposite to the upper connecting wall 12, and both of the lower connecting wall and the upper connecting wall are formed by bending the side wall 11 inward, so that the longitudinal beam 10 forms a C-shaped structure with an inward opening. The end of the cross beam 20 extends into the longitudinal beam 10 from the inside to the outside through the C-shaped opening of the longitudinal beam 10. In an embodiment, the cross beam 20 includes an upper connecting plate 212, a lower connecting plate 213 opposite to the upper connecting plate 212, and an end plate 23 located at the ends of the upper connecting plate 212 and the lower connecting plate 213. After the cross beam 20 is inserted into the longitudinal beam 10, the end of the cross beam 20 is placed between the upper connecting wall 12 and the lower connecting wall 13 of the longitudinal beam 10, the upper connecting plate 212 abuts against a lower surface of the upper connecting wall 12, the lower connecting plate 213 abuts against an upper surface of the lower connecting wall 13, and the end plate 23 abuts against an inner surface of the side wall 11. During assembly, the cross beam 20 is inserted into the longitudinal beam 10 along the width direction of the carriage. When the end plate 23 abuts against the side wall 11, it indicates that the cross beam 20 and the longitudinal beam 10 are matched in place. The upper connecting plate 212 and the upper connecting wall 12 are fixedly connected together by a first huck bolt 50, the lower connecting plate 213 and the lower connecting wall 23 are fixedly connected together by a second huck bolt 90, and the end plate 23 and the side wall 11 are fixedly connected together by a third huck bolt 40, thereby fixedly connecting the cross beam 20 and the longitudinal beam 10.

In the present disclosure, the longitudinal beam 10 has a structure with a C-shaped cross section, so that the end of the cross beam 20 can be inserted into the longitudinal beam 10. The end plate 23, the upper connecting plate 212 and the lower connecting plate 213 on the cross beam 20 respectively abuts against the side wall 11, the upper connecting plate 12 and the lower connecting wall 13 of the longitudinal beam 10. The end plate 23 and the side wall 11, the upper connecting plate 212 and the upper connecting wall 12, the lower connecting plate 213 and the lower connecting wall 13 are respectively fixedly connected by huck bolts in such a way that the third huck bolt connects the longitudinal beam 10 with the cross beam 20 along the width direction of the carriage, the first huck bolt and the second huck bolt connects the longitudinal beam 10 with the cross beam 20 along the height direction of the carriage. Because the longitudinal beam 10 and the cross beam 20 are fixed in a welding-free way, the longitudinal beam 10 and the cross beam 20 can be transported separately, so that the transportation cost is reduced. Meanwhile, the longitudinal beam 10 and the cross beam 20 can be fixed together by the huck bolts to realize the quick assembly of the carriage.

It should be noted that the carriage of the present disclosure is not limited to including two cross beams 20, and three or more cross beams 20 may be arranged between two longitudinal beams 10.

In a preferred embodiment, the top of the side wall 11 is further provided with a bent part 111 extending inward and a connecting part 112 extending downward from an inner side of the bent part 111, in other words, the side wall 11 is bent inward by 90 degrees to form a horizontal bent part 111, and then the bent part 111 is bent downward to form a vertical connecting part 112, and the upper connecting wall 12 is formed by bending the connecting part 112 inward. The upper connecting wall 12 is in a horizontal state so as to better fit an upper surface of the upper connecting plate 212 of the cross beam 20. Because the upper connecting wall 12 is in a suspended structure, a reinforcing piece is further arranged above a position of the upper connecting wall 12 cooperating with the cross beam 20. The reinforcing piece is fixed above the upper connecting wall 12, and includes a reinforcing bottom plate 14 that abuts against an upper surface of the upper connecting wall 12 and a reinforcing rib plate 15 formed by bending one end of the reinforcing bottom plate 14 upward. The reinforcing bottom plate 14 is used for increasing the thickness at a position where the upper connecting wall 12 is connected with the cross beam 20. The reinforcing rib plate 15 is perpendicular to a length direction of the longitudinal beam 10, and an outer side of the reinforcing rib plate abuts against the connecting part 112 and is welded fixedly to the connecting part 112. By using the reinforcing rib plate 15 between the connecting part 112 and the upper connecting wall 12, deformation at a joint between the upper connecting wall 12 and the connecting part 112 can be avoided. A threaded rod of the first huck bolt 50 passes through the upper connecting plate 212, the upper connecting wall 12 and the reinforcing bottom plate 14 in sequence from bottom to top, and a nut 51 of the first huck bolt 50 is pressed on an upper surface of the reinforcing bottom plate 14, so that the longitudinal beam 10 is reinforced at the position where the upper connecting wall 12 cooperates with the cross beam 20, and at the same time, the first huck bolt 50 extends through and is connected with the reinforcing piece to ensure that the connecting position of the upper connecting wall 12 and the cross beam 20 has better connection strength.

In another preferred embodiment, the trailer carriage of the present disclosure further includes brackets for mounting a suspension system of the vehicle. In order to further facilitate the carriage transportation, the brackets are also fixedly connected with the longitudinal beam 10 and the cross beam 20 by the huck bolts. In an embodiment, the brackets include an outer bracket 31 located outside the longitudinal beam 10 and an inner bracket 32 located inside the outer bracket 31 and opposite to the outer bracket 31. A mounting gap is formed between the inner bracket 32 and the outer bracket 31, which is suitable for the assembly of the suspension system. A top of the outer bracket 31 abuts against an outer surface of the side wall 11. The threaded rod of the third huck bolt 40 passes through the end plate 23, the side wall 11 and the top of the outer bracket 31 from inside to outside in sequence, and the nut 41 of the third huck bolt 40 is pressed on an outer surface of the outer bracket 31. That is to say, the third huck bolt 40 is used for fixedly connecting the end plate 23, the side wall 11 and the outer bracket 31. Of course, in order to ensure stability, the end plate 23, the side wall 11 and the outer bracket 31 may be connected by a plurality of third huck bolts 40 due to that a large mounting area is provided at the end of the cross beam 20. The outer bracket 31 is provided with a positioning groove 311, and a positioning part is formed on the longitudinal beam 10 at a joint position of the side wall 11 and the lower connecting wall 13. The positioning part and the positioning groove 311 form cooperatively a positioning assembly for positioning the outer bracket 31 and the longitudinal beam 10 during assembly. The positioning groove 311 may be formed in the outer bracket 31 via a bending structure. The bending shape is just the same as the shape of an arc chamfer at the joint of the upper side wall 11 and the lower connecting wall 13 of the longitudinal beam 10, so that the outer bracket 31 can be accurately aligned with the longitudinal beam 10 when being assembled with the longitudinal beam 10, facilitating the smooth passage of the threaded rod of the third huck bolt 40 through the end plate 23, the side wall 11 and the outer bracket 31, thereby improving the assembly efficiency. The inner bracket 32 includes two side plates 321 and a horizontal connecting plate 322. The two side plates 321 are arranged along a length direction of the carriage and are oppositely arranged. The horizontal connecting plate 322 is located between the two side plates 321, the horizontal connecting plate 322 abuts against a lower surface of the lower connecting plate 213 of the cross beam 20. The horizontal connecting plate 322 is connected with the lower connecting plate 213 via the fourth huck bolt 80. In order to ensure the strength of the cross beam 20 itself and the connection strength of the inner bracket 32, the longitudinal beam 10 and the cross beam 20, the cross beam 20 of the present disclosure includes a connecting beam 21 and a connecting beam 22, the connecting beam 21 and the connecting beam 22 have the same structure and are both C-shaped in cross section, and the C-shaped openings of the connecting beam 21 and the connecting beam 22 are opposite to each other. The connecting beam 21 and the connecting beam 22 each include an upper connecting plate 212, a lower connecting plate 213 and a web plate 211 connecting the upper connecting plate 212 and the lower connecting plate 213 together. The end plate 23 is welded at the ends of the connecting beam 21 and the connecting beam 22 to form an integral cross beam 20. The two side plates 321 of the inner bracket 32 respectively abut against outer sides of the webs 211 of the connecting beam 21 and the connecting beam 22 respectively, and the two side plates 321 are connected with the two web plates 211 via the fifth huck bolt 70 respectively. The horizontal connecting plate 322 is fixed on the connecting beam 21 and the lower connecting plate 213 of the connecting beam 22 via the fourth huck bolt 80. At the end of the cross beam 20, the lower connecting plates 213 of the connecting beam 21 and the connecting beam 22 are connected with the lower connecting wall 13 by the second huck bolt 90 respectively, and the upper connecting plates 212 of the connecting beam 21 and connecting beam 22 are connected with the upper connecting wall 12 by the first huck bolt 50. In addition, the connecting beam 21 is further provided with a supporting piece 24 located on the brackets of the upper connecting plate 212 and the lower connecting plate 213. The supporting piece 24 is Z-shaped, a top of the supporting piece 24 is arranged around the threaded rod of the first huck bolt 50, and a bottom of the supporting piece 24 is arranged around the threaded rod of the fourth huck bolt 80, so that the connecting beam 21 is reinforced inside the connecting beam 21 via the supporting piece 24. During assembly, the threaded rod of the first huck bolt 50 passes through the top of the support 24, the upper connecting plate 212, the upper connecting wall 12 and the reinforced bottom plate 14 in sequence from bottom to top, and the threaded rod of the fourth huck bolt 80 passes through a bottom of the supporting piece 24, the lower connecting plate 213 and the horizontal connecting plate 322 in sequence from top to bottom. Alternatively, the supporting piece 24 may further be provided on the connecting beam 22, and the connecting structure thereof is the same as that described above, so the description will not be repeated herein.

In addition, the lower connecting wall 13 is provided with a convex rib 131 protruding upward, the convex rib extends along a length direction of the longitudinal beam 10, and the longitudinal anti-bending strength of the lower connecting wall 13 can be increased via the convex rib 131. Meanwhile, after the cross beam 20 is inserted into the longitudinal beam 10, the lower connecting plate 213 of the cross beam 20 is placed above a top of the convex rib 131, and a lower support plate 16 is provided below the lower connecting wall 13 for covering an opening below the convex rib 131.

The lower support plate 16 is welded fixedly on an inner side of the outer bracket 31 in advance. A threaded rod of the second huck bolt 90 passes through the lower connecting plate 213, the convex rib 131 and the lower supporting plate 16 from top to bottom. A nut 91 of the second huck bolt 90 is pressed on a lower surface of the lower supporting plate 16. By tightening the nut 91 of the second huck bolt 90, the nut 91 fully presses the lower supporting plate 16. Because a certain gap exists between the convex rib 131 and the lower supporting plate 16, the convex rib 131 can be slightly deformed when the nut 91 is tightened, and the deformed convex rib 131 generates a certain pre-tightening force on the nut 91, so that the joint of the lower connecting plate 213 and the lower connecting wall 13 forms a tight-fitting connecting structure, thereby ensuring a better connecting strength.

Figure 5:
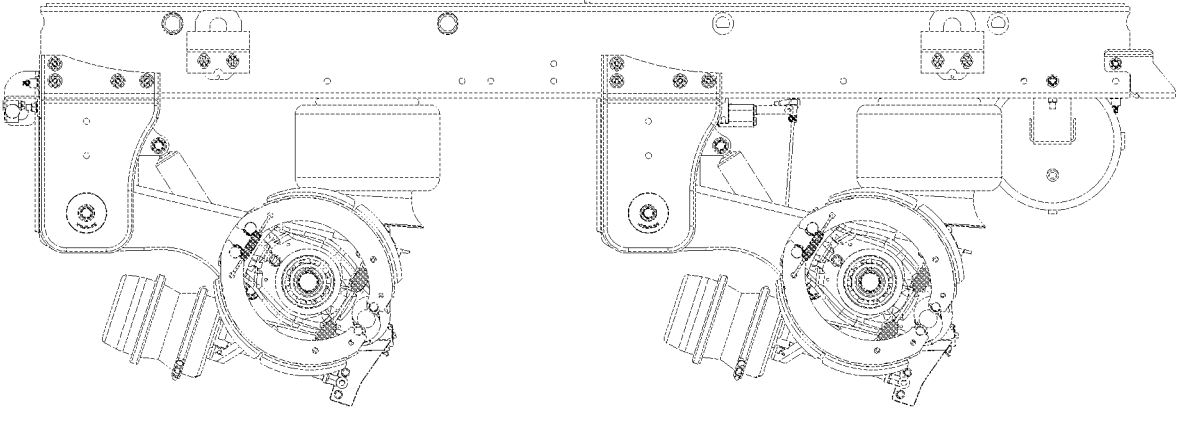
FIG. 5 is a schematic diagram of the present disclosure when in use.

Referring to FIG. 5, the carriage of the present disclosure can be mounted with an air suspension system, and the air suspension system can be mounted on the carriage through the above-mentioned bracket.

The above embodiments are for the purpose of illustration and description to the technical themes of the present disclosure merely, but are not intended to limit the present disclosure. Although the present disclosure has been illustrated in details according to the foregoing embodiments, those having ordinary skills in the art should understand that modifications can still be made to the technical themes recited in various embodiments described above, or equivalent substitutions can still be made to a part of technical features thereof, and these modifications or substitutions will not make the essence of the corresponding technical themes depart from the scope of the technical themes of various embodiments of the present disclosure.

What is claimed is:

1. A trailer carriage, comprising two longitudinal beams located at both sides of the carriage and at least two cross beams located between the two longitudinal beams, wherein:

each of the longitudinal beams comprises a side wall, an upper connecting wall located at a top of the side wall and a lower connecting wall located at a bottom of the side wall and opposite to the upper connecting wall;

each of the cross beams comprises an upper connecting plate, a lower connecting plate located below the upper connecting plate and opposite to the upper connecting plate, and an end plate located between end portions of the upper connecting plate and the lower connecting plate; an end portion of the cross beam is placed between the upper connecting wall and the lower connecting wall of the longitudinal beam, the upper connecting plate abuts against a bottom of the upper connecting wall, the lower connecting plate abuts against a top of the lower connecting wall, and the end plate abuts against an inner side of the side wall; and the upper connecting plate is connected with the upper connecting wall via a first huck bolt, the lower connecting plate is connected with the lower connecting wall via a second huck bolt, and the end plate is connected with the side wall via a third huck bolt;

wherein the top of the side wall is provided with a bent part extending inward and a connecting part extending downward from an inner side of the bent part, the upper connecting wall is formed by bending a bottom of the connecting part inward, and a reinforcing piece is arranged above the upper connecting wall, the reinforcing piece comprises a reinforcing bottom plate abutting against an upper surface of the upper connecting wall and a reinforcing rib plate bent upward from one end of the reinforcing bottom plate, the reinforcing rib plate is perpendicular to a length direction of the longitudinal beam, an outer edge of the reinforcing rib plate abuts against the connecting part and is welded fixedly to the connecting part, a threaded rod of the first buck bolt sequentially passes through the upper connecting plate, the upper connecting wall and the reinforcing bottom plate from bottom to top, and a nut of the first huck bolt is pressed on an upper surface of the reinforcing bottom plate.

2. The trailer carriage according to claim 1, wherein the trailer carriage further comprises brackets, the brackets comprise an outer bracket located outside the longitudinal beam and an inner bracket located inside the outer bracket, a mounting space is formed between the outer bracket and the inner bracket, a top of the outer bracket abuts against an outer surface of the side wall, a threaded rod of the third huck bolt sequentially passes through the end plate, a side wall and the top of the outer bracket from inside to outside, and a nut of the third huck bolt is pressed on an outer surface of the outer bracket.

3. The trailer carriage according to claim 2, wherein a lower supporting plate is welded fixedly on an inner side of the outer bracket, a convex rib protruding upward and extending along a length direction of the longitudinal beam is arranged on the lower connecting wall, the lower connecting plate is placed above a top of the convex rib, the lower supporting plate is covered at an opening below the convex rib, a threaded rod of the second huck bolt passes through the upper connecting plate, the convex rib and the lower supporting plate from top to bottom, and a nut of the second huck bolt is pressed on a lower surface of the lower supporting plate.

4. The trailer carriage according to claim 2, wherein the outer bracket is provided with a positioning groove, and a positioning part is formed at a joint position of the side wall and the lower connecting wall on the longitudinal beam, and the positioning part cooperates with the positioning groove to form a positioning assembly.

5. The trailer carriage according to claim 2, wherein the inner bracket comprises two side plates and a horizontal connecting plate positioned between the two side plates, and the horizontal connecting plate abuts against a lower surface of the lower connecting plate of the cross beam, and the horizontal connecting plate is connected to the lower connecting plate via a fourth huck bolt.

6. The trailer carriage according to claim 5, wherein the cross beam comprises two connecting beams with C-shaped cross sections, openings of the two connecting beams are oppositely arranged, and each connecting beam comprises an upper connecting plate, a lower connecting plate and a web plate for connecting the upper connecting plate and the lower connecting plate together; the two side plates of the inner bracket are respectively attached to outer sides of the two web plates of the cross beam, and the web plates and the side plates are connected by a fifth huck bolt.

7. The trailer carriage according to claim 6, wherein a supporting piece located between the upper connecting plate and the lower connecting plate is arranged in the connecting beam, the supporting piece is Z-shaped, and a top of the supporting piece is arranged around a threaded rod of the first huck bolt, and a bottom of the supporting piece is arranged around a threaded rod of the fourth huck bolt.

* * * * *